United States Patent
Ikeda et al.

(10) Patent No.: US 6,471,408 B1
(45) Date of Patent: Oct. 29, 2002

(54) SOLID LUBRICATING ROLLING BEARING

(75) Inventors: Norifumi Ikeda, Fujisawa (JP); Shin Nizeki, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/463,128

(22) PCT Filed: May 20, 1999

(86) PCT No.: PCT/JP99/02656
§ 371 (c)(1),
(2), (4) Date: Jan. 20, 2000

(87) PCT Pub. No.: WO99/60281
PCT Pub. Date: Nov. 25, 1999

(30) Foreign Application Priority Data

May 20, 1998 (JP) .............................. 10-138030

(51) Int. Cl.[7] ............................................. F16C 33/30
(52) U.S. Cl. ..................... 384/470; 384/456; 384/490
(58) Field of Search ................... 384/463, 470, 384/523, 521, 524, 530, 527, 533, 907, 551, 520, 572, 576, 577, 578, 465, 493; 439/5; 427/295; 419/32; 75/246

(56) References Cited

U.S. PATENT DOCUMENTS

| | | | |
|---|---|---|---|
| 1,209,537 A | | 12/1916 | Atkins |
| 3,647,273 A | * | 3/1972 | Pfaffenberger ............... 384/578 |
| 3,701,072 A | * | 10/1972 | Bjorn et al. .................... 439/5 |
| 3,712,694 A | | 1/1973 | Smith |
| 3,753,605 A | * | 8/1973 | Lehmann ..................... 384/465 |
| 3,801,172 A | * | 4/1974 | Veglia ......................... 384/578 |
| 3,960,413 A | * | 6/1976 | Abbuhl et al. ............... 384/551 |
| 3,989,326 A | * | 11/1976 | Hormann et al. ........... 384/572 |
| 4,024,303 A | * | 5/1977 | Hahn .......................... 427/295 |
| 4,493,513 A | | 1/1985 | Osawa et al. ................ 384/533 |
| 4,676,949 A | * | 6/1987 | Miyashita et al. ............ 419/32 |
| 4,728,204 A | * | 3/1988 | Colanzi et al. .............. 384/572 |
| 4,797,011 A | | 1/1989 | Saeki et al. ..................... 384/1 |
| 5,040,906 A | * | 8/1991 | Zornes ........................ 384/551 |
| 5,197,808 A | * | 3/1993 | Takata ......................... 384/493 |
| 5,486,052 A | * | 1/1996 | Sibley et al. ................ 384/463 |
| 6,139,599 A | * | 10/2000 | Takahashi et al. ............ 75/246 |

FOREIGN PATENT DOCUMENTS

| | | | |
|---|---|---|---|
| FR | 2 071 234 | | 9/1971 |
| JP | 59170528 | | 9/1984 |
| JP | 2-21027 | | 1/1990 |
| JP | 7-21927 | | 5/1995 |
| JP | 7-151152 | | 6/1995 |
| JP | WO 95/21337 | * | 8/1995 ................. 384/551 |
| JP | 8-4773 | | 1/1996 |
| JP | 8-232961 | | 9/1996 |
| JP | 9-144760 | | 6/1997 |
| JP | 10-47359 | | 2/1998 |
| JP | 10-292821 | * | 11/1998 ................. 384/551 |
| WO | WO 91/14108 | | 9/1991 |

OTHER PUBLICATIONS

German office action with English translation dated Mar. 22, 2002.

* cited by examiner

*Primary Examiner*—David A. Bucci
*Assistant Examiner*—Colby Hansen
(74) *Attorney, Agent, or Firm*—Crowell & Moring LLP

(57) ABSTRACT

A spacer type solid lubricating bearing disposing a spacer comprising a solid lubricating material, for example, graphite between each of rolling elements is proposed. A solid lubricating rolling bearing is provided with an inner ring, an outer ring, rolling elements, spacers of a material containing a solid lubricant comprising a selected material, and a cage with a pocket for accommodating at least one spacer and one rolling element as a unit.

7 Claims, 18 Drawing Sheets

FIG. 15

| | SPACER DIAMETER ds (mm) | SPACER HEIGHT h (mm) | SPACER DIAMETER/ROLLING ELEMENT DIAMETER Ds/dw | SPACER DIAGONAL LENGTH/ROLLING ELEMENT DIAMETER L₁/dw | CIRCUMFERENTIAL CLEARANCE δ₁ (mm) |
|---|---|---|---|---|---|
| EXAMPLE C-1 | 7.10 | 4.72 | 0.89 | 1.07 | 0.16 |
| EXAMPLE C-2 | 6.70 | 4.75 | 0.84 | 1.03 | 0.12 |
| EXAMPLE C-3 | 5.50 | 4.85 | 0.69 | 0.92 | 0.03 |
| COMP. EXAMPLE D-1 | 7.80 | 4.65 | 0.98 | 1.14 | 0.23 |
| COMP. EXAMPLE D-2 | 7.60 | 4.67 | 0.96 | 1.12 | 0.21 |
| COMP. EXAMPLE D-3 | 4.60 | 4.91 | 0.60 | 0.86 | −0.02 |
| COMP. EXAMPLE D-4 | 3.80 | 4.80 | 0.48 | 0.77 | 0.08 |
| COMP. EXAMPLE D-5 | 2.50 | 4.80 | 0.31 | 0.68 | 0.08 |

FIG. 18

| | SPACER DIAMETER ds(mm) | SPACER HEIGHT h(mm) | SPACER DIAMETER/ROLLING ELEMENT DIAMETER Ds/dw | CIRCUMFERENTIAL CLEARANCE $\delta = \delta_1 + \delta_2$ (mm) | CIRCUMFERENTIAL CLEARANCE/ ROLLING ELEMENT DIAMETER $\delta/dw$ (%) |
|---|---|---|---|---|---|
| EXAMPLE E-1 | 4.15 | 2.8 | 0.87 | 0.20 | 4.0 |
| EXAMPLE E-2 | ↑ | ↑ | ↑ | 0.40 | 8.4 |
| EXAMPLE E-3 | ↑ | ↑ | ↑ | 0.60 | 12.5 |
| EXAMPLE E-4 | ↑ | ↑ | ↑ | 0.95 | 19.9 |
| EXAMPLE E-5 | ↑ | ↑ | ↑ | 0.01 | 0.2 |
| COMP. EXAMPLE F-1 | ↑ | ↑ | ↑ | 0.00 | 0.0 |
| COMP. EXAMPLE F-2 | ↑ | ↑ | ↑ | 1.10 | 23.1 |

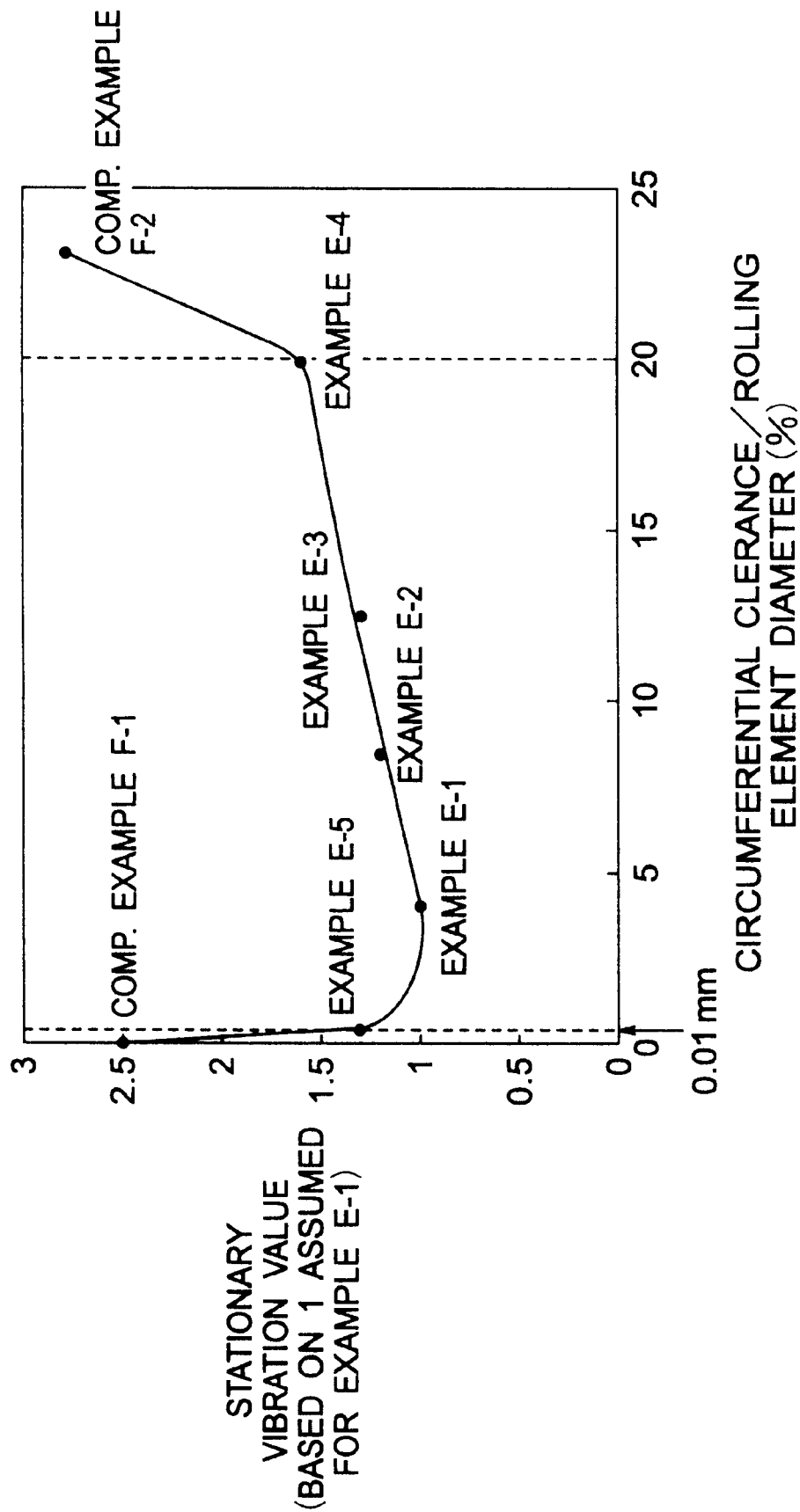

FIG. 20

| | MATERIAL FOR SPACER | COMPRESSION STRENGTH OF SPACER (MPa) | SPACER DIAMETER/ROLLING ELEMENT DIAMETER ds/dw | CIRCUMFERENTIAL CLEARANCE $\delta = \delta_1 + \delta_2$ (mm) |
|---|---|---|---|---|
| EXAMPLE I-1 | Fe alloy + 60% MoS$_2$ | 140 | 0.86 | 0.60 |
| EXAMPLE I-2 | Ni alloy + BN series solid lubricant | 200 | ← | ← |
| EXAMPLE I-3 | Ni alloy + CrB + BN series solid lubricant | 70 | ← | ← |
| COMP. EXAMPLE J-1 | Sintered graphite material (fiber reinforced) | 30 | ← | ← |
| COMP. EXAMPLE J-2 | Sintered graphite material | 10 | ← | ← |

FIG. 22

| | SPACER DIAMETER ds (mm) | SPACER HEIGHT h (mm) | SPACER DIAMETER/ROLLING ELEMENT DIAMETER Ds/dw | SPACER DIAGONAL LENGTH/ROLLING ELEMENT DIAMETER L₁/dw | CIRCUMFERENTIAL CLEARANCE $\delta = \delta_1 + \delta_2$ (mm) |
|---|---|---|---|---|---|
| EXAMPLE G-1 | 8.38 | 5.51 | 0.88 | 1.05 | 0.50 |
| EXAMPLE G-2 | 5.52 | 5.70 | 0.58 | 0.83 | 0.31 |
| COMP. EXAMPLE H-1 | 8.38 | 5.51 | 0.88 | 1.05 | 0.00 |
| COMP. EXAMPLE H-2 | 8.38 | 5.51 | 0.88 | 1.05 | 2.00 |
| COMP. EXAMPLE H-3 | 3.81 | 5.78 | 0.40 | 0.73 | 0.23 |

SOLID LUBRICATING ROLLING BEARING

TECHNICAL FIELD

The present invention relates to an improvement for a self lubrication type solid lubricating rolling bearing used under a circumstance such as at high temperature, in vacuum or at high temperature in vacuum for which grease lubrication can not be adopted.

BACKGROUND OF THE ART

For rolling bearings used under a circumstance such as at high temperature, in vacuum or at high temperature in vacuum for which grease lubrication as a general lubrication system can not be adopted, bearing lubrication of a solid lubricating system has been conducted so far. In the existent solid lubrication rolling bearing, it has been considered in an early stage to prepare a crown type cage by a solid lubricating material as a lubricant supply source. However, the solid lubricating material is extremely fragile and sometime suffers from cracking or chipping during assembling of bearings. In view of the above, a spacer type solid lubricating bearing in which a cage is separated and disposed between each of rolling elements has been considered. Various methods have been proposed as a method of assembling spacers in the spacer type solid lubricating bearings and, for example, Japanese Unexamined Patent Publications Nos. 7-151,152 and 9-144760 disclose a method of inserting a spacer from an insertion recess disposed to a portion of a bearing. Further, Japanese Unexamined Patent Publication No. 8-4773 discloses a method of inserting a cylindrical spacer from a portion between inner and outer rings vertically in a circumferential direction and, at the same time, sealing the portion between the inner and the outer rings by a shield in a rolling bearing.

Further, Japanese Utility Model Publication No. 7-21927 discloses a cage for a rolling bearing in which a concave portion as a pocket capable of containing at least two rolling elements is formed, and a graphite spacer is interposed between the rolling elements contained in each pocket.

DISCLOSURE OF THE INVENTION

In the spacer type solid lubricating bearing in which the recess for the insertion of the spacer is disposed to a portion of the bearing as disclosed in the publication described above for incorporating the spacer, not only the fabrication cost increases, but also the inserted spacer is caught by the recess to hinder the rotation and, accordingly, sometimes causes abnormal vibrations. Particularly, in a case where an axial load exerts on the bearing, since the rolling face approaches the recess, abnormal vibrations tend to be generated to bring about a problem that the spacer is dropped depending on the case.

Further, when the solid lubricating spacer is interposed between each of the rolling elements, the number of the spacers required for one shaft is increased to increase the cost, as well as a circumferential impact caused to the spacer during rotation is increased to bring about a problem of injuring the spacer.

Particularly, even if a special cage is used, when a material comprising graphite is used as a main ingredient for the spacer to be interposed between the rolling elements, the spacer is abraded rapidly and a circumferential gap is remarkably increased in the cage to result in a problem that no sufficient effect can be obtained for extending the service life. Further, in such an application use where a high load exerts on the spacer, the spacer is sometimes destroyed to result in a problem also in view of reliability. Further, since the lubricating performance of graphite is degraded in vacuum, the bearing life is limited when used in vacuum.

In view of the above, it is an object of the present invention to provide a solid lubricating rolling bearing of a high reliability at a reduced cost with no hindrance to rotation caused by interference of a spacer, free from the worry of dropping of the spacer, and capable of attaining smooth and safe rotation with less vibrations.

The present invention relates to a solid lubricating rolling bearing capable of attaining such an object.

The solid lubricating rolling bearing according to the present invention has an inner bearing, an outer bearing, rolling elements, spacers made of a material containing a solid lubricant, and a cage with a pocket for accommodating at least one spacer and one rolling element as a unit. With such a constitution, the solid lubricating rolling bearing of the present invention needs no recess for incorporating a spacer. Therefore, fabrication cost for the existent recessed portion can be reduced to lower the cost and no abnormal vibrations are generated since the inserted spacer is not caught to the recessed portion and does not hinder the rotation. In addition, since the inserted spacer is constrained by rolling elements on both sides, it is free from the worry of detaching and dropping out of a race way groove of inner and outer rings due to vibrations. In addition, in view of the lubricating performance, since all rolling elements are in contact each at least at a portion thereof with the spacer containing the solid lubricant, and the solid lubricant transfers and deposits (transfer deposition) to the contact face of the rolling element, satisfactory lubricating performance can be obtained by the solid lubricant.

Further, in the solid lubricating rolling bearing according to the present invention, since the cage is constituted as a cage accommodating two rolling elements for putting the spacer therebetween as a unit, the number of spacers can be decreased to one-half the number of rolling elements, so that the cost can be reduced, as well as the circumferential impact caused to the spacer during rotation of the bearing is decreased to suppress the injury of the spacer, since two rolling elements and one spacer are accommodated as one unit in a pocket of the cage, compared with the existent cage in which rolling elements and spacers are combined each by an identical number.

Further, in the solid lubricating rolling bearing according to the present invention, since the size of the circumferential clearance of the pocket in the cage is defined within a range from 0.01 mm to 20% for the diameter of the rolling element, the bearing torque and vibrations of the cage can be suppressed effectively.

Further, in the solid lubricating rolling according to the present invention, since the diameter of the spacer is defined as 0.50 to 0.95 times the diameter of the rolling element, it is possible to suppress the rotation torque thereby preventing localized abrasion and keeping the vibration level low.

Further, in the solid lubricating rolling bearing according to the present invention, since the radius of curvature for the pocket of the cage at the contact face with the rolling element is defined as from 1.01 to 1.10 times the radius of the rolling element, an appropriate clearance is between the cage and the rolling element to prevent vibrations of the cage.

In the solid lubricating rolling bearing according to the present invention, since the material for the spacer is made of a self-lubricating sintered composite material comprising one of molybdenum disulfide, tungsten disulfide or boron nitride, or molybdenum disulfide and tungsten disulfide as a main ingredient of a lubricant and obtained by sintering the ingredient for the lubricant together with a metal selected from Fe, Cu, Ni, W. Sn and Cr or an oxide, a nitride and a boride thereof, it is possible to prevent occurrence of excess abrasion dusts or cracking of the spacer. Particularly, the self-lubricating sintered composite material comprising 80% or less of a lubricant ingredient that comprises molybdenum disulfide and tungsten disulfide as the main ingredient and the balance of an Fe series alloy has higher strength compared with those comprising graphite as the main ingredient, shows appropriate abrasion amount, can be used both in atmospheric air and in vacuum and is suitable to the bearing of the present invention. However, when the bearing of the present invention is used at a temperature of 350° C. or higher, a self-lubricating sintered composite material having a lubricant mainly comprising boron nitride and Ni alloy in combination is more suitable to the spacer material.

The solid lubricating rolling bearing according to the present invention can be used suitably, for example, as a bearing for supporting axles of a Kiln car used at a high temperature and at a low speed.

BRIEF DESCRIPTION OF THE DRAWINGS

FIG. 15 is a table showing the size of spacers in Example 2 as a comparative experiment.

FIG. 18 is a table showing the size of spacers in Example 3 as a comparative experiment, FIG. 19 is a graph showing the result of a test (circumferential clearance and vibration value) in Example 3.

FIG. 20 is a table showing the material and the size of spacers in Example 4 as a comparative experiment.

FIG. 22 is a table showing the size of spacers in Example 5 as a comparative experiment.

Figure 1:
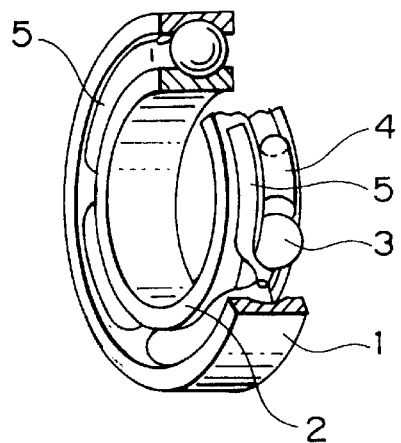
FIG. 1 is a partially cut away perspective view for a solid lubricating rolling bearing according to the present invention.

DESCRIPTION OF REFERENCES:

1. . . outer ring,
2. . . inner ring,
3. . . rolling element,
4. . . spacer,
5. . . cage.

BEST MODE FOR PRACTICING THE INVENTION

The present invention is to be described more in details referring to the drawings.

Figure 2:
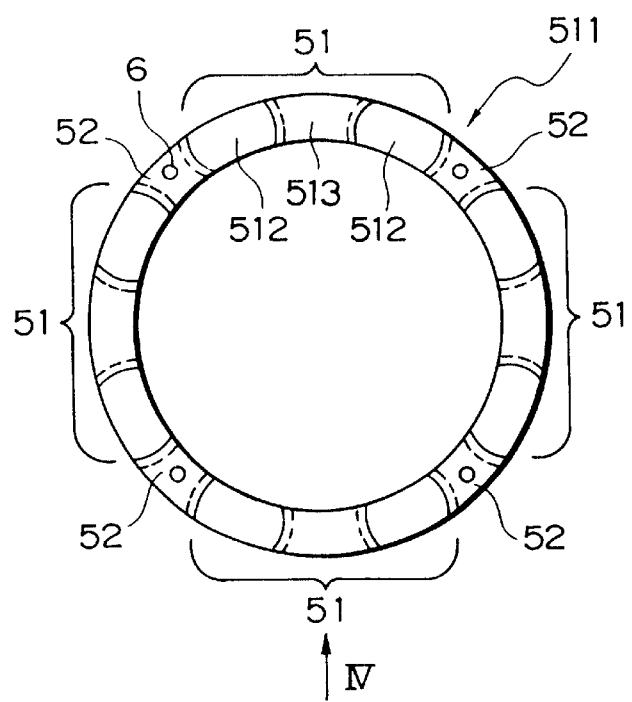
FIG. 2 is a front view for a cage of the bearing shown in FIG. 1.
Figure 3:
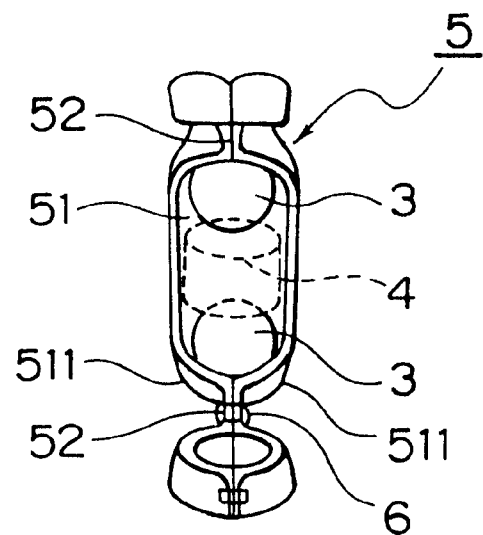
FIG. 3 is an enlarged fragmentary view for the cage shown in FIG. 1.
Figure 4:
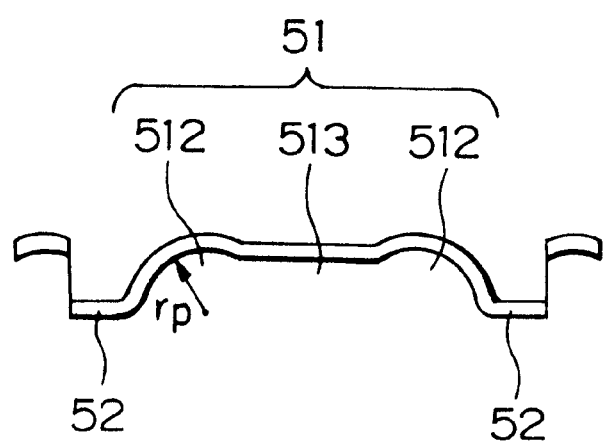
FIG. 4 is a side view for one surface of the cage shown by an arrow IV in FIG. 2.
Figure 5:
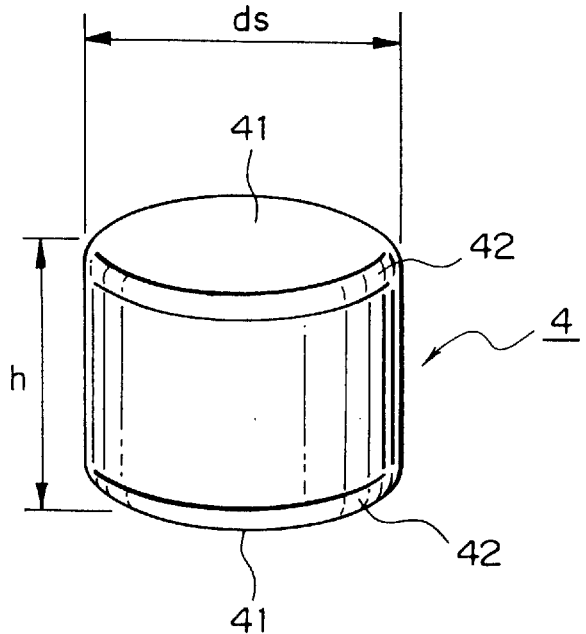
FIG. 5 is a perspective view for a spacer.

FIG. 1 to FIG. 5 show a solid lubricating deep groove ball bearing as an embodiment of the solid lubricating rolling bearing according to a present invention, in which FIG. 1 is a partially cut away perspective view, FIG. 2 is a front view for a cage of the bearing, FIG. 3 is an enlarged fragmentary view of the cage thereof, FIG. 4 is a side view for one surface of the cage shown by an arrow IV in FIG. 2, and FIG. 5 is a perspective view of a spacer. In the ball bearing, rolling elements (balls in this embodiment) 3 are disposed by the number of eight each at a predetermined distance in the circumferential direction between an outer ring 1 and an inner ring 2. Two balls 3 are paired in one set and accommodated together with one spacer 4 interposed between them into a pocket 51 of a cage 5 to constitute one unit.

The spacer 4 is of a cylindrical shape as shown in FIG. 5 in which the diameter ds is greater than the width (or height) h between both end faces 41, 41 (h<ds), the diameter ds is designed so as to conform the shape of a raceway surface of the inner and outer rings 1, 2 of the bearing to be described later, and the corner at the end face 41 is chamfered. The chamfering 42 facilitates the operation of inserting the spacer 4, and the chamfer size x is calculated by using the equation to be described later. In the illustrated embodiment, the chamfering 42 is applied as angled chamfer but it may be applied as R chamfer. Further, while the corner at the end face 41 is chamfered for the entire circumference, this is not restrictive but a portion of the corner for both end faces 41, 41 may be chamfered at least on one diagonal line of the spacer 4. However, when only the portion is chamfered, since it is necessary to align the chamfering direction with the inner and outer ring surfaces upon insertion into the bearing, this makes the inserting operation troublesome and a portion of the corner, if remained, tends to be broken, so that chamfering is preferably applied for the entire circumferential as much as possible. Further, if chamfering is not applied for reducing the number of steps upon preparation of the spacer, the operation of inserting the spacer can be facilitated by setting the length for the diagonal line of the spacer to the condition to be described later. However, also in this cases, the corner of the spacer is preferably fabricated to an extent of fine chamfering in order to prevent minute destruction.

The spacer 4 comprises a material having a solid lubricating function and, specifically, may include those prepared by mixing a solid lubricating material such as natural or artificial graphite material, boron nitride, molybdenum disulfide or tungsten disulfide with a reinforcing filler such as glass fiber, heat resistant resin fiber or carbon fiber and bonding with an organic or inorganic binder followed by sintering, or prepared by composite sintering of the solid lubricating material and a heat resistant alloy such as of iron, nickel and cobalt.

In the structure of the solid lubricating rolling bearing according to the present invention, if excess abrasion dusts or small lumps are caught between each of the outer and inner rings 1, 2, rolling elements 3 and the cage 5, a vibration value of the bearing increases to make the rotation impossible depending on the case. Further, if the spacer is cracked by impact or compression due to collision of the rolling elements during rotation, since the bearing is locked and stopped suddenly, it may sometimes give undesired effects also on a device to which the bearing is mounted. Particularly, in an application use requiring a high rotational accuracy, since the inner clearance has to be decreased to a limit, making it particularly sensitive to excess lumpy abrasion dusts. Further, also in a bearing used under the condition of high temperature and high load, since the load on the spacer 4 increases, a possibility of cracking the spacer is increased. As a countermeasure for the problems described above, while it may be considered to increase the strength of the spacer 4, a solid lubricant mainly comprising graphite is not suitable since it is generally fragile and liable to be abraded (compression strength at about 10 MPa).

On the other hand, a self-lubricating sintered composite material comprising 80% or less of a lubricant ingredient that comprises molybdenum disulfide and tungsten disulfide as the main ingredient and the balance of an Fe series alloy is excellent in the strength (compression strength at about 140 MPa) and shows appropriate abrasion amount. Further, since it can be used both in atmospheric air and in vacuum with no troubles, it is suitable to the bearing of the present invention. However, since molybdenum disulfide is oxidized at a temperature near 350° C. to deteriorate the lubricating characteristics, if the bearing of the present invention is used at a temperature higher than the above-mentioned level, a self-lubricating sintered composite material comprising a lubricant that comprises boron nitride as a main ingredient and an Ni alloy composition therewith can be utilized effectively.

In the lubricant described above, if the lubricant ingredient exceeds 80%, reinforcement by the metal matrix is insufficient to deteriorate the material strength and increase the abrasion amount. Accordingly, it is preferred that the amount of the lubricant ingredient is 80% or less and, particularly, about from 40 to 60%.

The cage 5, in the illustrated embodiment, is a pressed type cage in which two annular press formed metal plates 511, 511 each having an arcuate pocket 51 that contains two balls and one spacer 4 put between them as one unit at each of four circumferentially equi-divided portions are combined being opposed to each other and joined integrally by clamping each connection portion 52 between the pockets 51 at each of four positions by a rivet 6. The clamping means is not restricted only to the rivet 6 but a turn-back type joining used generally in a cage of a small diameter bearing may be adopted. Each of the pocket 51 at each of four portions of the annular metal plates 511, 511, has ball containing portions 512, 512 at two positions in each of which a curved surface is formed conforming the spherical surface of the ball 3 on both ends of the pocket and is formed with a spacer containing portion 513 in which a curved surface is formed conforming the cylindrical surface of the spacer 4 at the intermediate position.

The cage of the solid lubricating rolling bearing according to the present invention is shaped so as to have a pocket containing, for example, one spacer and two rolling elements and it is desirable to have a structure of retaining the rolling elements and the spacer at curved surfaces having a predetermined radius of curvature in the vertical direction and the circumferential direction. By embracing the rolling elements and the spacer with the curved surfaces, it is possible to fix the position for the cage during rotation and keep the central axis for each of the spacer and the rolling elements substantially constant during rotation, so that stable rotation can be maintained for a long period of time.

In this case, the curvature of the cage is preferably 1.02 to 1.10 times the diameter of the rolling element both in the vertical direction and the circumferential direction. If the curvature is 1.01 times or less of the rolling element, the efficiency of discharging the lubricant from a clearance between the cage and the rolling element is worsened and no appropriate lubrication condition can be maintained.

If the radius of curvature is excessively large, the central axes for the spacer and the rolling element may be displaced, as well as the cage may be in contact with the end faces of the outer and inner rings. Although rotation of the bearing can be maintained also in such a case, it is not preferred because this causes fluctuation of torque or vibrations. For obtaining an appropriate radius of curvature easily, it is desired to use a pressed type cage. Further, in the application use requiring the strength of the cage, a surface treatment such as nitridation is applied or a cage obtained by grinding is used.

Further, when a bearing having rolling elements by an odd number is adapted in a basic design specification as a solid lubricating structure described in the present invention, it may be considered to adopt a constitution in which one of the cage pockets contains one rolling element and one spacer, or a constitution in which three rolling elements and two spacers are alternately contained. However, since the shape of the cage in these constitutions is not uniform in the circumferential direction, the rotational stability of the bearing is sometimes impaired.

In view of the above, on the condition that the load endurance performance of the bearing is satisfied, the number of the rolling elements decreased from the odd number to the even number, by which the shape for all pockets is made so as to accommodate two rolling elements and one spacer. In this case, if the rolling elements are disposed uniformly on the circumference, since the distance between the rolling elements is increased and the circumferential clearance increases in the case of inserting the spacer, it is necessary to make the angle between the rolling elements smaller to adjust to an appropriate circumferential clearance.

In this case, the initial circumferential clearance is preferably determined within a range from 0.01 mm to 20% for the diameter of a rolling element. If the circumferential clearance has a minus value, bearing can not rotate since the spacer urges to constrain the rolling element to the cage. Further, if the initial circumferential clearance is less than 0.01 mm although it has a plus value, the two rolling elements that put the spacer therebetween interfer with the pocket of the cage to increase the initial torque, as well as the rolling elements and the spacer abut under pressure against each other in the pocket of the cage by intrusion of abrasion dusts generated from the spacer to cause locking of the bearing. On the other hand, if the clearance exceeds 20% for the diameter of the rolling element, this promotes the rotational vibrations due to collision between the rolling element and the spacer, as well as the spacer may turn down easily to hinder the rotation of the bearing. Accordingly, the size of the total clearance δ is selected as: δ=0.01 mm~20% for the diameter of the rolling element as will be described later.

Procedures for assembling the bearing of the invention constituted as described above are as follows:

It is assumed that eight balls 3 are already incorporated between the outer bearing 1 and the inner bearing 2.

(1) Balls 3 are gathered at one position on the circumference of the bearing.

Figure 6:
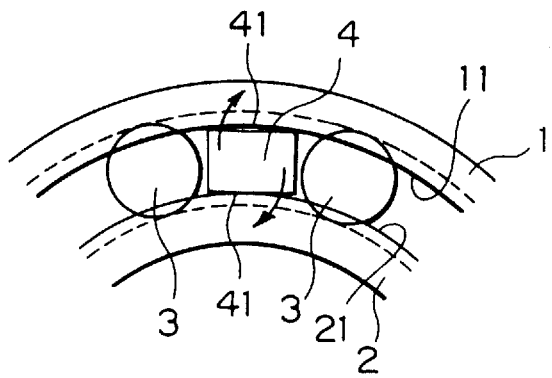
FIG. 6 is a view explaining procedures of mounting the spacer.
Figure 6:
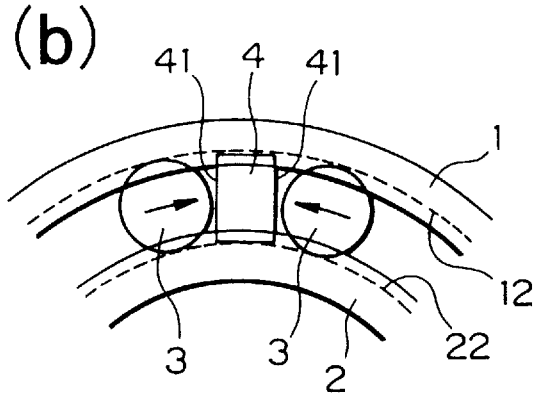

(2) One spacer 4 is inserted to a vacant space S between inner and outer bearings formed by gathering the balls 3. In this case, as shown in FIG. 6(a), the spacer 4 is at first inserted such that the both end faces 41 thereof face the bore diametral surface 11 of the outer ring as a guide surface of the outer ring 1, and the outside diametral surface 21 of the inner ring as the guiding surface of the inner ring 2 respectively. Then, as shown in FIG. 6(b), the spacer 4 is turned along the groove surface 12 of the outer ring 1 and the groove surface 22 of the inner ring 2 to face both end faces 41 of the spacer 4 to the circumferential direction of the bearing.

(3) Two balls 3 are moved to opposite ends each from an optional end of a group of balls gathered at one place, and one of the balls 3 is brought into contact with one end face 41 of the inserted spacer 4. The other end face 41 of the spacers is brought into contact with the ball on the other side. Thus, one spacer 4 is put between the two balls 3 being in contact with them.

(4) The steps (2) and (3) above are repeated till the balls not in contact with the spacer 4 are not present (four times in the illustrated embodiment).

(5) Unit groups each comprising two balls 3 and one spacer 4 put therebetween (4 groups) are arranged in an equivalent distribution in the circumferential direction of the bearing.

(6) Two annular press-formed metal plates 511, 511 for the cage 5 (refer to FIG. 2) are inserted into a clearance between the inner and the outer rings from both sides of the bearing and each of the unit groups is contained in each of the pockets 51.

(7) Joint portions 52 of the cage 5 as abutted portion of the two formed metal plates 511, 511 are connected integrally by clamping with rivets.

Figure 7:
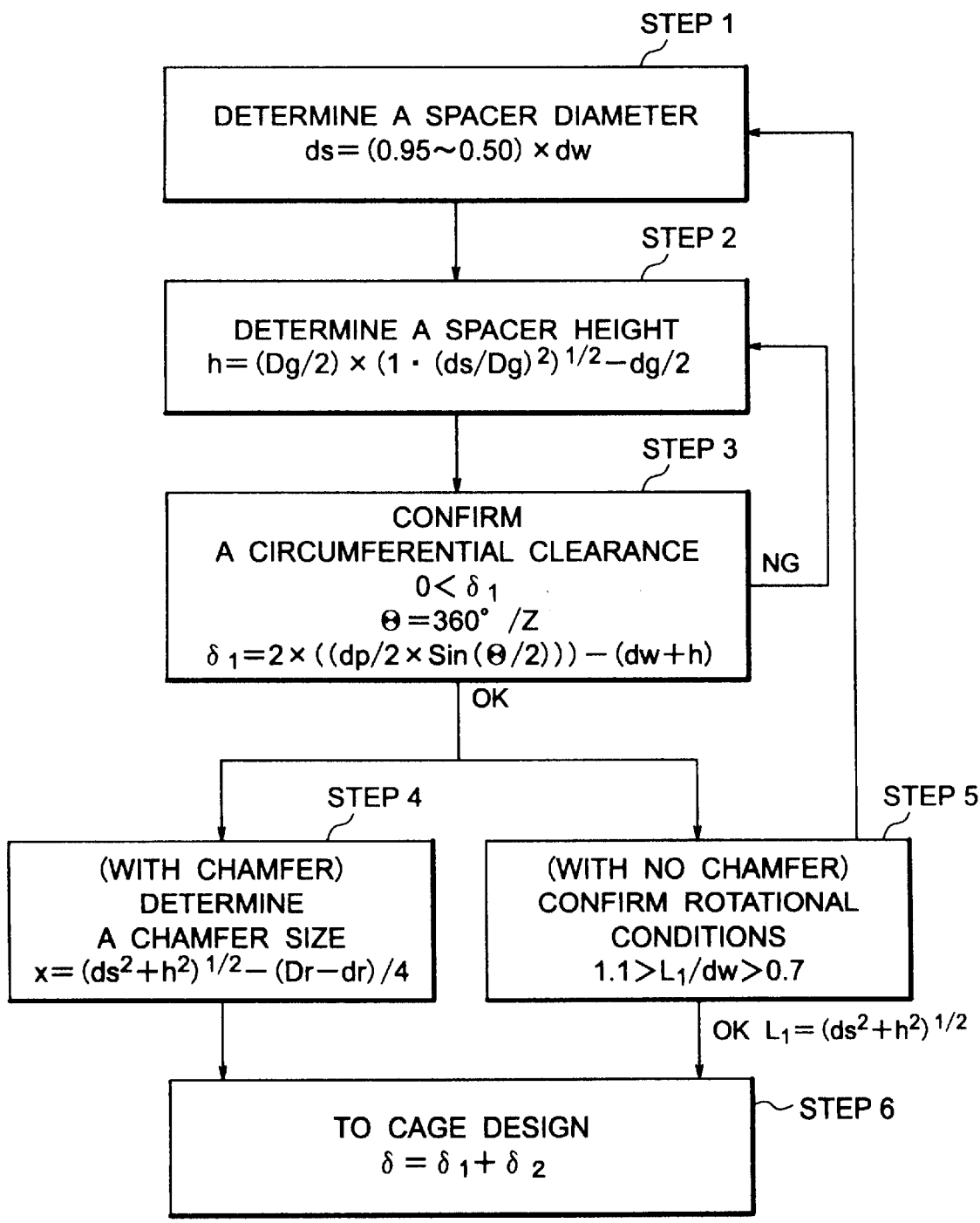
FIG. 7 is a flow chart showing a method of determining the size of a spacer.

The method of determining the size of the spacer 4 in the present invention is to be described with reference to the flow chart of FIG. 7.

For making the spacer 4 such that it can be inserted to a portion of inner and outer bearings without disposing a recess for the insertion of the spacer as in the prior art and such that it does not detach after the insertion, the size for each of the portions is determined as below in relation with the size of the inner and outer rings.

Step 1: Determination for the Diameter ds for the Cylindrical Spacer 4

It may suffice basically that the diameter ds of the spacer 4 is basically smaller than the diameter dw of the rolling element 3. However, since it tends to detach from the raceway surface if the diameter is extremely small, it is based on about 90% for the diameter dw of the rolling element 3.

That is, while it is preferred that the standard diameter ds of the spacer is about 0.90 dw, it can be adjusted within a range from 0.95 to 0.5 times the diameter of the rolling element. If the diameter of the spacer is greater than 0.95 times the diameter of the rolling element, not only the assembling is difficult but also the corners of the spacer interfere with the rolling contact surface of the inner ring tending to cause lumpy abrasion dusts by minute destruction during rotation. The thus formed abrasion dusts are intruded between the rolling element and the outer and inner rings to fluctuate torque and increase vibrations. On the contrary, if the size is less than 0.5 times, the rolling elements can not put the spacer therebetween at an equatorial portion to cause rotation failure of the bearing due to the problem such as localized abrasion of the spacer and riding of the rolling element over the spacer.

Accordingly, the spacer diameter is defined as: ds=(0.95–0.5)×dw.

Step 2: Determination for the Height (or Width) h of the Cylindrical Spacer 4.

It is assumed here as:

dw: diameter of rolling element 3

Dg: diameter of outer ring guide surface 11 (bore diameter of outer ring)

dg: diameter of inner ring guide surface 21 (outside diameter of inner ring), ds: diameter of spacer 4 h: height (or width) of spacer

Dr: diameter of outer ring groove 12 dr: diameter of inner ring groove 22 x: chamfer dimension on diagonal line of a spacer.

Figure 8:
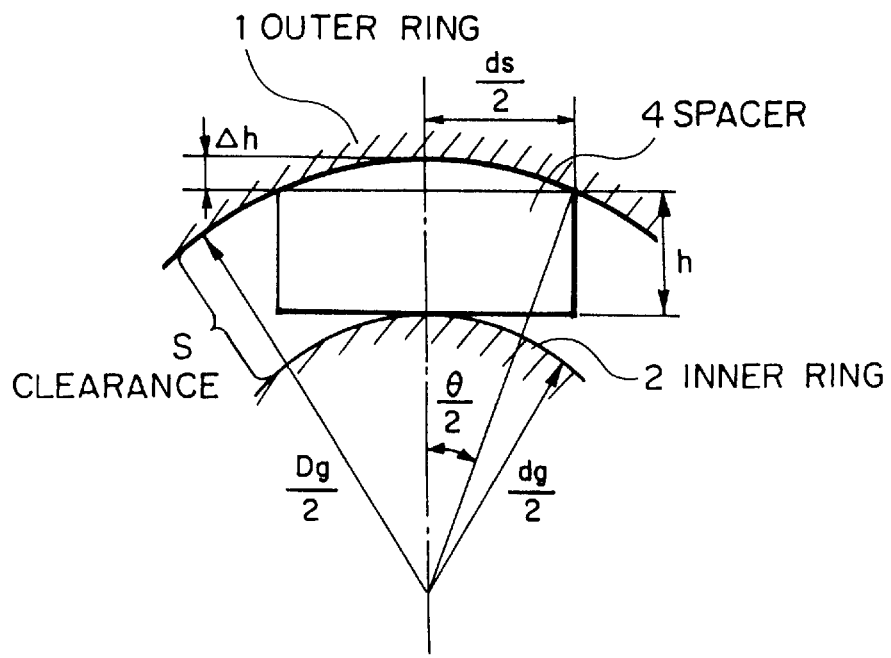
FIG. 8 is a geometrical view for determining a calculation formula for the size of the spacer.

The height h of the spacer 4 is conditioned that it passes through a clearance S between the outer ring 1 and the inner ring 2. From the state shown in FIG. 8 (state in FIG. 6(a));

$$\Delta h + h = (Dg/2) - (dg/2) \tag{1},$$

$$\Delta h = (Dg/2) - (\text{i } Dg/2)\cos\theta/2 \tag{2},$$

and $$\cos(\theta/2) = (1 - \{(ds/2)/(Dg/2)\}^2)^{1/2} \tag{3}$$

$$= (1 - (ds/Dg)^2)^{1/2}$$

$$= (1/Dg)(Dg^2 - ds^2)^{1/2}$$

From the equations (1), (2) and (3) above:

$$h = (1/2)(Dg - dg) - \Delta h \tag{4}$$

$$= (1/2)(Dg - dg) - (Dg/2)\{1 - \cos(\theta/2)\}$$

$$= (1/2)\{Dg \cdot \cos(\theta/2) - dg\}$$

$$= (1/2)\{(Dg^2 - ds^2)^{1/2} - dg\}$$

$$= (Dg/2)\{1 - ds/Dg)^2\}^{1/2} - dg/2$$

The height h of the spacer 4 is determined from the inner diameter Dg of the outer ring and the outer diameter dg of the inner ring according to the equation (4).

Step 3: Confirmation for the Circumferential Clearance in the Pocket of a Cage.

Figure 9:
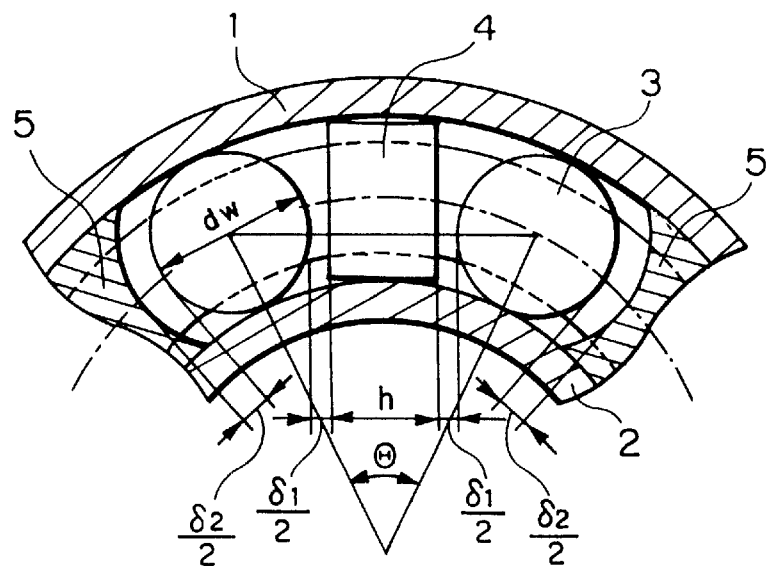
FIG. 9 is a geometrical view for determining a calculation formula for the size of a pocket clearance in the circumferential direction of the spacer.

As another constraining condition, it is necessary to properly define the circumferential clearance when a spacer is accommodated being put between two rolling elements in the pocket of the cage. The amount of clearance $\delta$ in the pocket of the cage varies with the abrasion of the spacer during rotation, which is obtained in the initial state as shown in FIG. 9(state in FIG. 6(b)) as the sum: $\delta=\delta_1+\delta_2$:

$$\delta_1 = 2\times((dp/2\times\sin(\theta/2))-(dw+h)) \qquad (5)$$
$$= dp\times\sin(\theta/2)-(dw+h)$$

$\delta_2=(\alpha-1)\times dw+(0.01-0.1)\times dw$, in which $\delta_1$: amount of circumferential clearance between rolling element and spacer $\delta_2$: amount of circumferential clearance between rolling element and cage surface dw: diameter of rolling element dp: pitch circle diameter of bearing $\theta$: angle between rolling elements $\alpha$: radius of curvature/radius of rolling element for the contact surface of the cage pocket with the rolling element/radius of rolling element h: spacer height The angle $\theta$ between the rolling elements is an angle formed between both of the rolling elements putting the spacer therebetween, and $\theta=360/z$ in a case where rolling elements by the number of Z (even number) are uniformly arranged for the circumference of 360°. If Z is an odd number, $\theta$ is different for one set.

Further, $\alpha$ is a value obtained by dividing the radius of curvature in the cage pocket in the circumferential direction with the radius of a rolling element, which is set to about 1.01 to 1.10 (to be detailed later). Accordingly, $\delta_2$ is a positive value determined by the shape of the cage. It is necessary that the spacer height is adjusted such that $\delta_1$ affected by the spacer height does not take a negative value. This is because the bearing can not sometimes rotatable in a case where $\delta_1<0$, since the spacer urges to constrain the rolling element to the cage.

As a result, it may suffice that the total clearance: $\delta=\delta_1+\delta_2$ in the circumferential direction in the cage is not 0 but, actually, $\delta_1$ and $\delta_2$ are separately designed. Since $\delta_1$ is determined depending on the height h of the spacer, an appropriate value for $\delta_1$ (>0) determines h.

If the value $\delta_1$ is not positive, the flow returns to step 2 and procedures of determining a new h according to the equation (4), proceeding to step 3 again, determining $\delta_1$ according to the equation (5) and confirming the polarity thereof are repeated. If $0<\delta_1$ is confirmed, the flow goes to the next step.

The circumferential clearance can be adjusted also by adjusted the size of the pocket of the cage but, since this makes the circumferential arrangement of the rolling elements not uniform, a minute circumferential clearance is desirably controlled based on the spacer height.

Step 4: Determination for the Size X of Chamfer at 42 of a Cylindrical Spacer 4

Since chamfering for the spacer is conducted mainly with a purpose of facilitating the inserting operation of the spacer, it is not always necessary so long as the condition for the diameter and the length of the spacer are satisfied accurately. However, the corner of the spacer tends to cause minute destruction due to contact with the rolling element to some-times form lumpy abrasion dusts. If the lumpy abrasion dusts are intruded by a great amount to the inside of the bearing it causes rotation failure, so that the corner is desirably treated to such an extent of edge chamfering.

The condition for the chamfer size x of the spacer 4 is that the spacer 4 can rotate within a space between the outer ring groove surface 12 and the inner ring groove surface 22.

Figure 10:
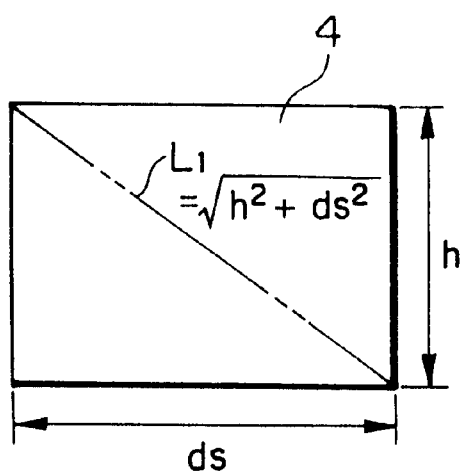
FIG. 10 is a geometrical view for calculating the chamfering size of the spacer.
Figure 10:
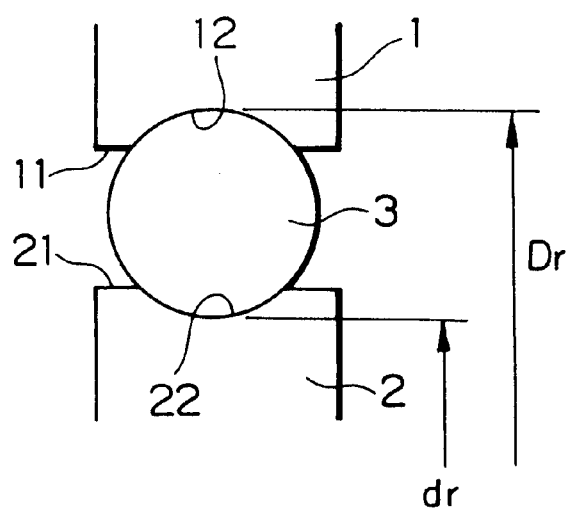
Figure 10:
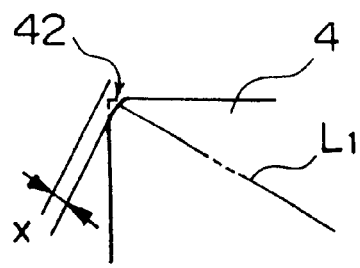

In view of FIG. 10, the spacer 4 is longest along the length $(h^2+ds^2)^{1/2}$ of the diagonal line $L_1$ and chamfer is conducted on the line. Then, assuming the chamfer size for the allowing rotation on one side as x, $$2x=(h^2+ds^2)^{1/2}-(Dr-dr)/2$$
$$\therefore x=(h^2+ds^2)^{1/2}/2-(Dr-dr)/4 \qquad (6)$$

The chamfer size x of the spacer 4 is determined according to the equation (6) based on the diameter Dr for the outer ring surface groove 12, the diameter dr for the inner ring groove surface 22, the height h and the diameter ds of the spacer 4. The thus determined chamfer size x is a lower limit value in the calculation and, if the value is set somewhat greater than the limit, the inserting operation for the spacer 4 is facilitated and the spacer 4 can be prepared easily.

As a calculation example, applied to a single row deep groove ball bearing of bearing number 6204, assuming ball diameter dw: 7.938 mm bore diameter Dg of outer ring: 38.6 mm outside diameter dg of inner ring: 28.5 mm outer ring groove diameter Dr: 41.4 mm inner ring groove diameter dr: 25.6 mm, the diameter ds of the cylindrical spacer 4 is determined as $ds=0.9\times 7.938$ mm$\approx 7.1$ mm, and the height h of the cylindrical spacer 4 is determined according to the equation (4) as:

$$h=(Dg/2)\{1-(ds/Dg)\}^{1/2}-dg/2=(38.6/2)\times\{1-(7.1/38.6)^2\}^{1/2}-28.5/2\approx 4.7(\text{mm})$$

Further, the chamfer size x (radius of curvature on one side) is determined by using the equation (6) as:

$$x = (h^2+ds^2)^{1/2}/2-(Dr-dr)/4$$
$$= (4.7^2+7.1^2)^{1/2}/2-(41.4-25.6)/4$$
$$= 0.3 \text{ (mm)}$$

Step 5: Confirmation for the Rotational Condition in Case of not Applying Chamfer When chamfer is not applied, it is confirmed whether the spacer can rotate or not in a space between the outer bearing groove surface and the inner bearing groove surface. As can be seen from FIG. 10, if the diagonal length $L_1$ of the spacer 4 is smaller than the diameter dw of the ball 3 (L<dw), it can rotate in the groove space between the outer ring and the inner ring.

Then, for facilitating the rotation of the spacer 4, the size of the spacer is preferably controlled such that the length $L_1$ for the diagonal line of the spacer is about 1.1 to 0.7 times the diameter dw of the rolling element. That is, since the length $L_1$ for the diagonal line of the spacer is determined as:

$L_1=(ds^2+h^2)^{1/2}$, it is confirmed that:

$1.1>L_1/dw>0.7$ is established. 1.1 is an allowable upper limit value in view of experience and, if $L_1$ exceeds 1.1 times dw, rotation of the spacer becomes difficult and assembling is not possible. On the other hand, if it is less than 0.7 times, the spacer easily drops off during rotation to sometimes hinder stable rotation of the bearing.

If the result of the confirmation for the rotational condition is out of the range described above, the flow returns to the step 1.

Step 6: Starting Design for the Cage

The total clearance δ in the circumferential direction in the cage 3 ($=\delta_1+\delta_2$) is previously determined (refer to FIG. 9). Since an appropriate value for the circumferential clearance δ1 between the rolling element and the spacer has already been determined in the step 3, the circumferential clearance δ2 between the rolling element and the cage surface is determined by the following equation.

$$\delta_2=(\alpha-1)\times dw$$

in which α is a constant represented by a ratio between the radius of curvature $r_p$ (of the contact surface of the rolling element) in the circumferential direction of the cage pocket (refer to FIG. 4) and the rolling element radius dw/2.

$$\alpha=r_p/(dw/2)$$

When it is set as: α>1, one point contact between the cage and the rolling element is avoided and satisfactory lubrication can be obtained. However, if an extremely large value is set, contact becomes unnecessarily loose to make the clearance larger between the cage and the rolling element and, as a result, it causes vibrations of the cage. In view of the above, it is selected approximately as: α=1.01~1.10.

Accordingly, $\delta_2$=(0.01~0.10) dw and, after all, the total clearance $\delta=\delta_1+\delta_2$ is selected to such a value of from 0.01 mm to 20% for the diameter of the rolling element as already described above. If it is less than 0.01 mm, the bearing torque is increased, if it exceeds 20% for the diameter of the rolling element, vibrations of the cage are increased.

Since the solid lubricating rolling bearing according to the present invention constituted as described above does not require any recess for incorporating the spacer 4 (insertion port), the following various functions and effects can be obtained.

Fabrication cost for the portion of the recess (insertion port) can be reduced.

Since the inserted spacer does not hinder the rotation being caught by the recess irrespective of the presence or absence of the axial load, generation of abnormal vibrations can be prevented.

Since the inserted spacer is put between and constrained at end faces on both sides by the rolling elements, it is free from the worry of detaching and dropping out of the raceway groove of the inner and outer rings by vibrations.

Since the number of the spacers can be reduced to one-half relative to the number of the rolling elements, the cost can be reduced, as well as since two rolling elements and one spacer are accommodated as one unit in the pocket of the cage, circumferential impacts caused to the spacer during rotation of the bearing are decreased and injury of the spacer can be suppressed compared with the existent case in which the rolling elements and the spacer are combined each by an identical number. In addition, with regard to the lubricating function, since any rolling element is in contact with the spacer containing the solid lubricant at least at one position and since the solid lubricant transfers and deposits to the contact surface of the rolling element (transferring deposition), satisfactory lubricating performance can be obtained by the solid lubricant.

The solid lubricating rolling bearing of the present invention is a rolling bearing in which a spacer containing a solid lubricant is put between the rolling elements and solid lubrication is conducted by the transfer deposition of the solid lubricant to the rolling elements. Since transfer deposition of the solid lubricant is not sufficient in the initial stage of rotation, the lubricating effect in the initial stage can be attained by forming a solid lubrication film to the rolling element or the cage (entire surface), the sliding surface of the bearing raceway ring (for example, outside diameter surface of inner and outer rings) or the raceway surface like that for the spacer.

Further, while the embodiment has been described to a single row deep groove ball bearing, present invention is applicable also to other ball bearings. Furthermore, it is not restricted to the ball bearing but optionally applicable also to each of cylindrical, conical or spherical roller bearings.

Further, while the embodiment has been described to an example of using a pressed type cage, it is not restricted only thereto but is applicable also to other types such as a crown type, machined type or punched type.

Further, while the embodiment has been described to the cage having the pocket for accommodating one spacer and two rolling elements in a case of using an even number (for example, eight) of rolling elements but, in a case of using rolling elements of an odd number, one of the pockets of the cage is adapted to accommodate one rolling element and one spacer, three rolling elements and two spacer, of alternately. In summary, the solid lubricating rolling bearing of the present invention comprises a cage for accommodating at least one rolling element and one spacer.

EXAMPLE 1

A comparison test conducted for confirming the effect of the present invention is to be described.

Test bearings used those of bearing number 6204 both for examples and comparative examples, and used a self lubricating sintered composite material comprising 55% of a lubricant ingredient comprising molybdenum disulfide and tungsten disulfide as the main ingredient and the balance of an Fe series alloy as the material for the spacer to be incorporated.

A: Example

As an example, a solid lubricating deep groove ball bearing was used as an embodiment of the present invention (refer to FIG. 1–FIG. 5).

B: Comparative Example

As comparative examples, the following four kinds of solid lubricating deep groove ball bearings (6204) were manufactured and used.

COMPARATIVE EXAMPLE B-1

Figure 11:
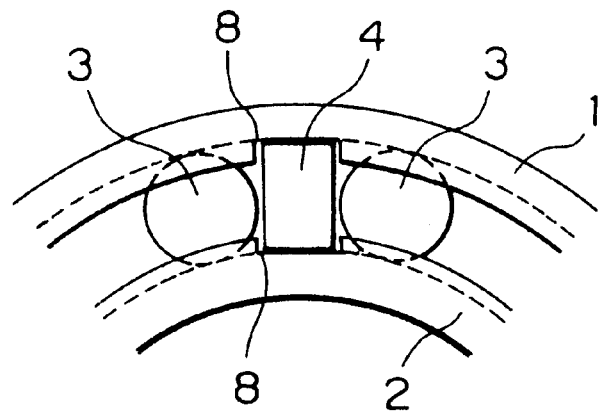
FIG. 11 is an explanatory view for the structure of a comparative example.

As shown schematically in FIG. 11, a portion of the bore surface 11 of the outer ring 1 and the outside surface 21 of the inner ring 2 was recessed to form a spacer insertion port 8.

COMPARATIVE EXAMPLE B-2

A spacer was disposed between each of the rolling elements without using a cage.

COMPARATIVE EXAMPLE B-3

Figure 12:
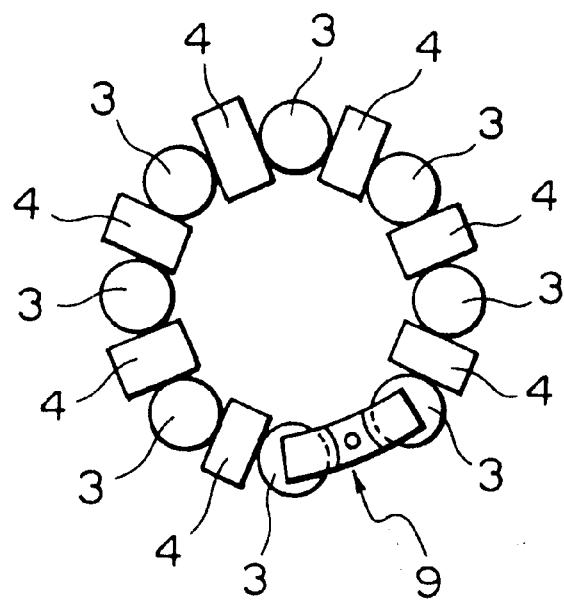
FIG. 12 is an explanatory view for the structure of a comparative example.

As shown schematically in FIG. 12, one segment type cage 9 to constrain two balls was used as a cage in which one spacer 4 is disposed between each of the balls 3 by the number of eight, namely, seven spacers in total, and one segment type holder 9 was inserted instead of the last spacer.

COMPARATIVE EXAMPLE B-4

Figure 13:
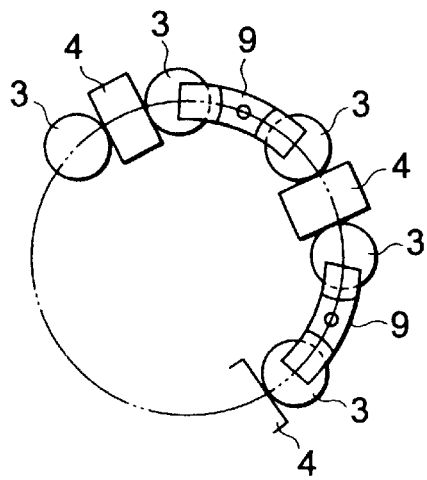
FIG. 13 is an explanatory view for the structure of a comparative example.

As shown partially in FIG. 13, four sets of segment type cages 9 each constraining two balls were disposed equally in a circumferential direction and a spacer 4 was inserted between each of the sets.

Figure 14:
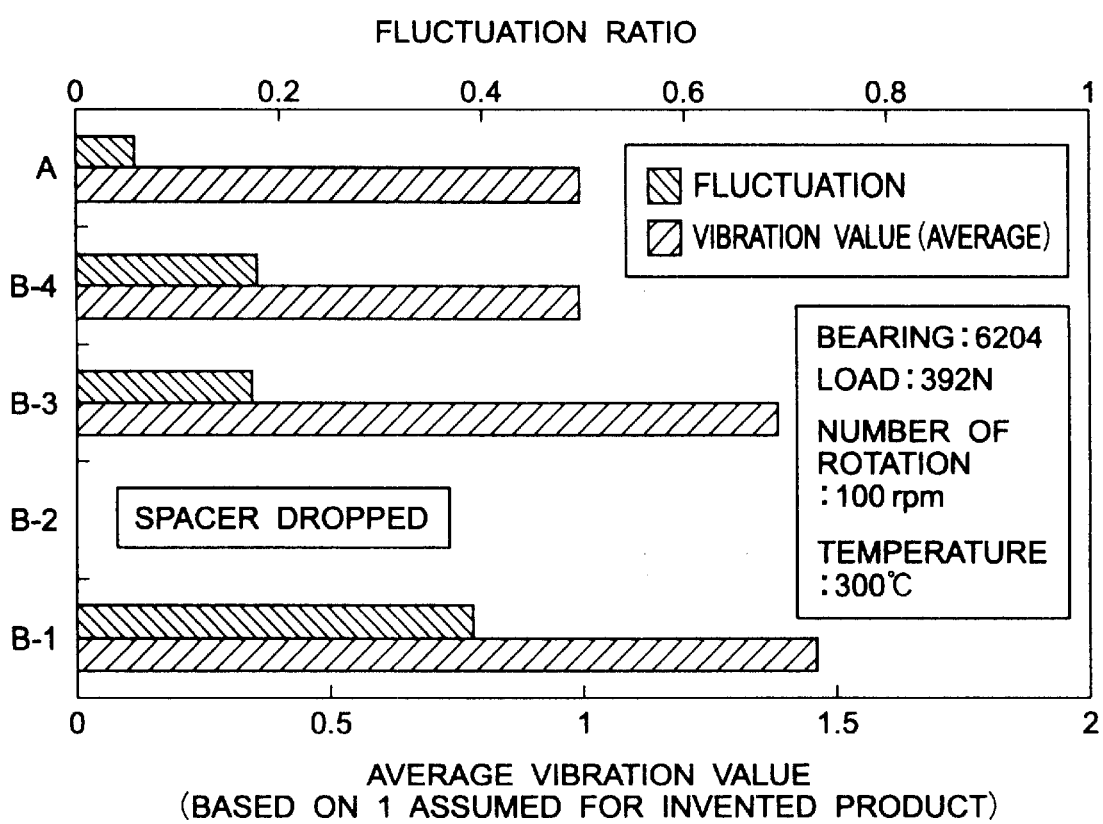
FIG. 14 is a graph showing the result of measuring vibration characteristics for examples and comparative examples.

A rotation test was conducted under compulsory heating at a temperature of 300° C. using each of the bearings of the above noted example and the comparative examples as the specimens, the stationary vibration value during rotation was measured by using an acceleration type pick-up, and an average value for vibrations (average vibration value) and a fluctuation range of vibrations (amplitude) were determined to evaluate the performance in comparison. FIG. 14 shows each of the average variation values and the ratio of the fluctuation range of the vibrations relative to each of the average vibration values (fluctuation ratio) for comparative example B calculated assuming the average vibration value as 1 for Example 1 of the present invention.

The results of evaluation are as shown below.

COMPARATIVE EXAMPLE B-1

When the rolling element revolves, since the spacer revolving simultaneously interferes with the recess at the spacer insertion port 8, both of the average vibration value and the fluctuation ratio were greatest among the specimens.

COMPARATIVE EXAMPLE B-2

The spacer was dropped in the initial stage of rotation and the test was interrupted. This is because the rolling element and the spacer had no restriction with each other during rotation since there was no cage and, accordingly, the spacer could displace from the attitude before rotation into the direction tending to drop easily.

COMPARATIVE EXAMPLE B-3

When the segment type cage 9 with appropriately controlled length was inserted instead of the last spacer and the distance between each of the rolling elements and the spacer is shortened, since spacer was constrained at both end faces respectively with the rolling elements, the free rotation of the spacer could be eliminated to prevent dropping but, upon transition of the rolling element from a loaded region to a non-loaded region (or in the non-loaded region), a fragile spacer is chipped due to the impact between the rolling element and the spacer to result in an engaging phenomenon between the rolling element and the race surface, which caused deterioration of the vibration characteristics.

COMPARATIVE EXAMPLE B-4

Since the number of spacer was decreased and the discharging amount of the abrasion powder of the spacer was suppressed, it showed an average vibration value at the same level as that in the example but since constriction was applied only between the rolling elements by the segment type cage 9, the fluctuation range of vibrations caused by collision between the rolling element and the space was much more greater than that of the example upon transition of the rolling element from the loaded region to the non-loaded region in the same manner as described above.

Contrary to the Comparative Examples B, in the case of the Example A, the spacer was constricted by the rolling elements on every unit by containing one spacer and two rolling elements as a unit group in the pocket of the cage and joined. Therefore, the spacer and the rolling element collided only within each unit group, and the vibration characteristics are excellent compared with each of Comparative Examples B. From the result of the graph, it can be seen that the example was improved such that the average vibration value was reduced by 30% and the fluctuation range for the vibration value was reduced to about 1/10.

EXAMPLE 2

As other examples of the solid rolling lubricating bearing of the present invention, a rolling bearing of bearing number 6204 incorporated with solid lubricating spacers of the size shown in Table of FIG. 15 (bearing material: SUS 440 C for inner/outer ring, SUS 304 for cage, radial clearance: 60–100 μm, material for spacer: Fe alloy+$MoS_2$ composite material) were trially manufactured and a rotational test was conducted.

The rotational test was conducted under a radial load of 196N, a number of rotation at 100 rpm and an atmospheric temperature of 300° C. and the radial vibration value and the rotational torque value during rotation were measured. The test was conducted on the standard value based on the values three times the stationary vibration value and stationary torque value in Example C-1 tested at first and the test was completed when either the vibration value or the torque value of the test bearing exceeded the standard value.

Figure 16:
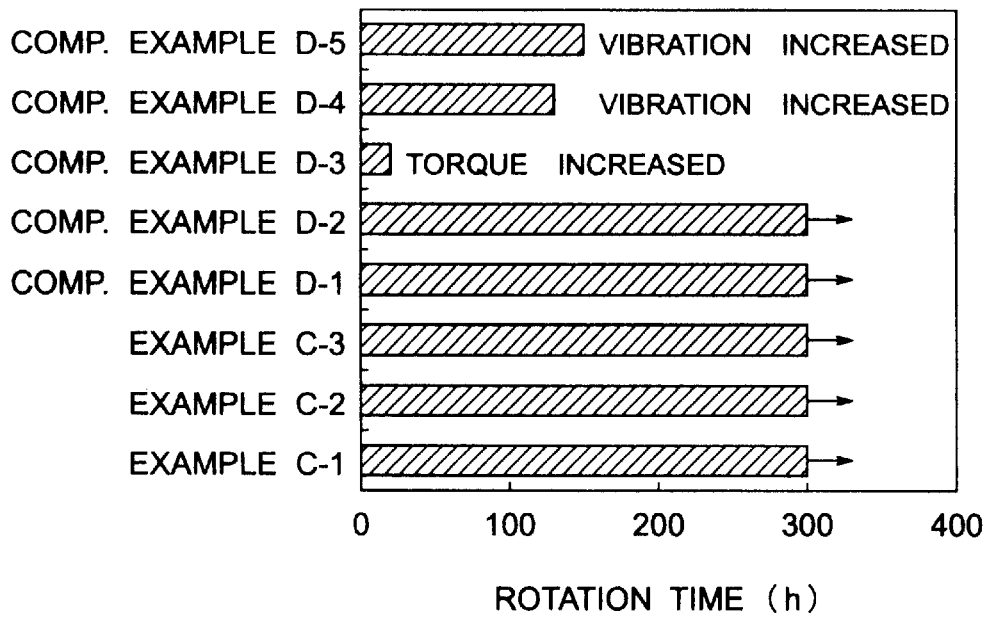
FIG. 16 is a graph showing the result of a test (rotation time) in Example 2.
Figure 17:
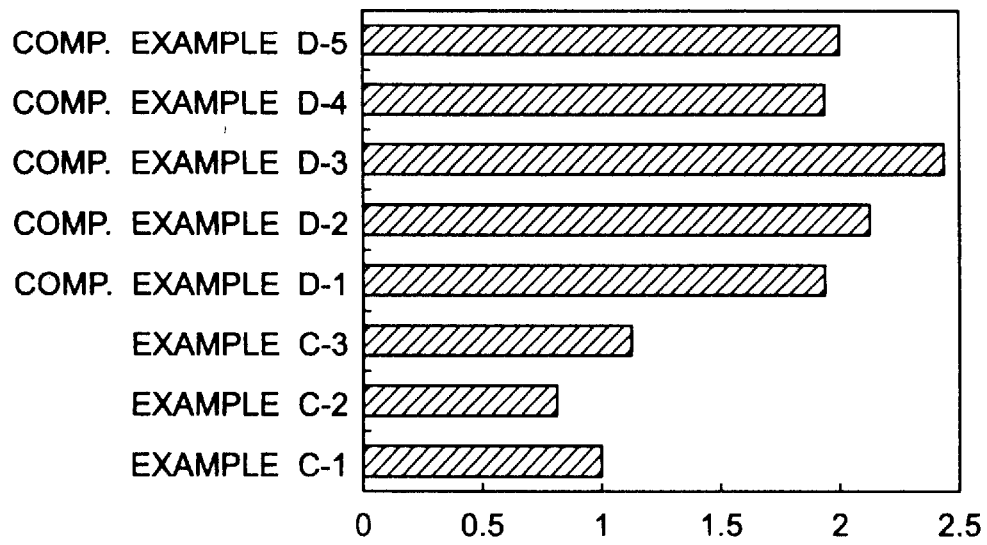
FIG. 17 is a graph showing the result of a test (vibration value) in Example 2.

Further, for those in which the standard values were not exceeded after 300 hours, the test was interrupted at that instance and the result of the test for the rotational life time is shown in FIG. 16. FIG. 17 shows a comparative value for the stationary vibrations in each of examples and comparative examples assuming the stationary vibration value in Example C-1 as 1.

Examples C-1 to C-3 are products of the present invention in which the ratio of the diameter of the spacer to the rolling element diameter (ds/dw) was defined within a range from 0.89 to 0.69. In Comparative Examples D-1 and D-2, the spacer diameter was made somewhat greater than the range of the present invention in which the ratio to the diameter of the rolling element was about 0.98 to 0.96. In Comparative Example D-3, although ds/dw was at 0.6 within the range of the present invention, the circumferential clearance $\delta_1$ of the spacer between the rolling elements was a negative value.

In Comparative Examples D-4 and D-5, the spacer diameter was made smaller than the range of the present invention and ds/dw was about 0.48 to 0.31. In the two examples, the spacer height was adjusted such that the circumferential clearance δ1 had no negative value.

Any of Examples C-1 to C-3 was satisfactory both in the working life and the vibrations and rotated up to 300 hrs while maintaining a low vibration level.

Comparative Examples D-1 and D-2 could rotate up to 300 hrs and showed good working life but, since $L_1$/dw ratio exceeded 1.1, assembling was extremely difficult and the chamfer portion was chipped to cause large vibrations. Comparative Example D-3 showed large rotational torque even from the initial stage of rotation and stopped about after of 20 hours due to excess torque. The excess torque was caused by intrusion of lumpy abrasion powder to a portion between the cage and the rolling element. Any of Comparative Examples D-4 and D-5 was stopped due to vibrations near 150 hrs. The spacers were locally abraded at corners and generated an extremely great amount of abrasion powder compared with the examples.

EXAMPLE 3

As another examples of the solid lubricating rolling bearing according to the present invention, those of bearing number 6002 incorporated with a solid lubricating spacers of a size shown in the table of FIG. 18 (bearing material; SUS 440 C for inner/outer rings, SUS 304 for cage, diameter of rolling element: 4.763 mm, radial clearance: 50~90 μm, spacer material: Fe alloy+MOS$_2$ composite material) were manufactured trially and subjected to a rotational test. These of bearing number 6002 basically had nine rolling elements but they were adapted to a shape for accommodating two rolling elements and one spacer each in four pockets by reduce the number of the rolling elements to eight.

After setting the spacer size, a pocket size for the cage was determined considering to change the amount of the circumferential clearance. In the table of FIG. 18, the circumferential clearance δ was defined as from 0.01 mm to 20% for the diameter of the rolling element, more preferably, from 0.01 mm to 10% for the diameter of the rolling element as a more stable range for the stationary vibration value in Examples E-1 to E-4. The pocket for the cage was adjusted as: δ<0.01 mm in Comparative Example F-1 and as: δ>0.953 mm in Comparative Example F-2.

The rotational test was conducted under an axial load of 19.6N, at a number of rotation of 500 rpm and in an ambient temperature atmosphere and the stationary vibration values during rotation of the bearing were measured. The results are shown in FIG. 19.

Among the examples, the vibrations were lowest in a case where the circumferential clearance was 0.2 mm shown in Example E-1. As the circumferential clearance increased, the vibration values also increased, but it was satisfactory up to 0.8 mm of the circumferential clearance.

On the other hand, in Comparative Example F-1 with the circumferential clearance δ of less than 0.01 mm, the torque was large tending to form abrasion powder and vibrations are were 2.5 times as large as those in Example E-1. Further, in comparative Example F-2 in which δ exceeded 20% for the diameter of the rolling element, vibrations were further increased because of larger clearance than that in Comparative Example F-1.

EXAMPLE 4

For investigating the effects of the spacer material on the rotational characteristics in the solid lubricating rolling bearing according to the present invention, a rotational test was conducted by using bearings incorporated with spacer materials of different strength.

As test bearings, those of bearing No. 6206 each incorporated with the solid lubricating spacer made of the material and having the compression strength and the size shown in the table of FIG. 20 (outer diameter: 62 mm, inner diameter: 30 mm, width: 16 mm, rolling element diameter: 9.52 mm and the radial clearance: 80 μm) were used. Generally, the bearings had nine rolling elements but one of the rolling elements was taken out for making the structure uniform and the test was conducted for the rolling elements by the number of eight. In this case, the allowable rated load of the bearing decreased from 19500 N to 18000 N. The test conditions were at a test load of 980N (maximum surface pressure of 2.0 GPa), at a number of rotation of 50 rpm, at an atmospheric temperature of 300° C. and in an atmospheric air.

In the test, values three times the vibration value and the torque value for each of the samples at the initial stage were defined as the standard values and the test was completed at the instance the vibration value or the torque value of the test bearing exceeded the standard value. Further, for those not exceeding the standard value even after 300 hours, the test was terminated at the instance.

Figure 21:
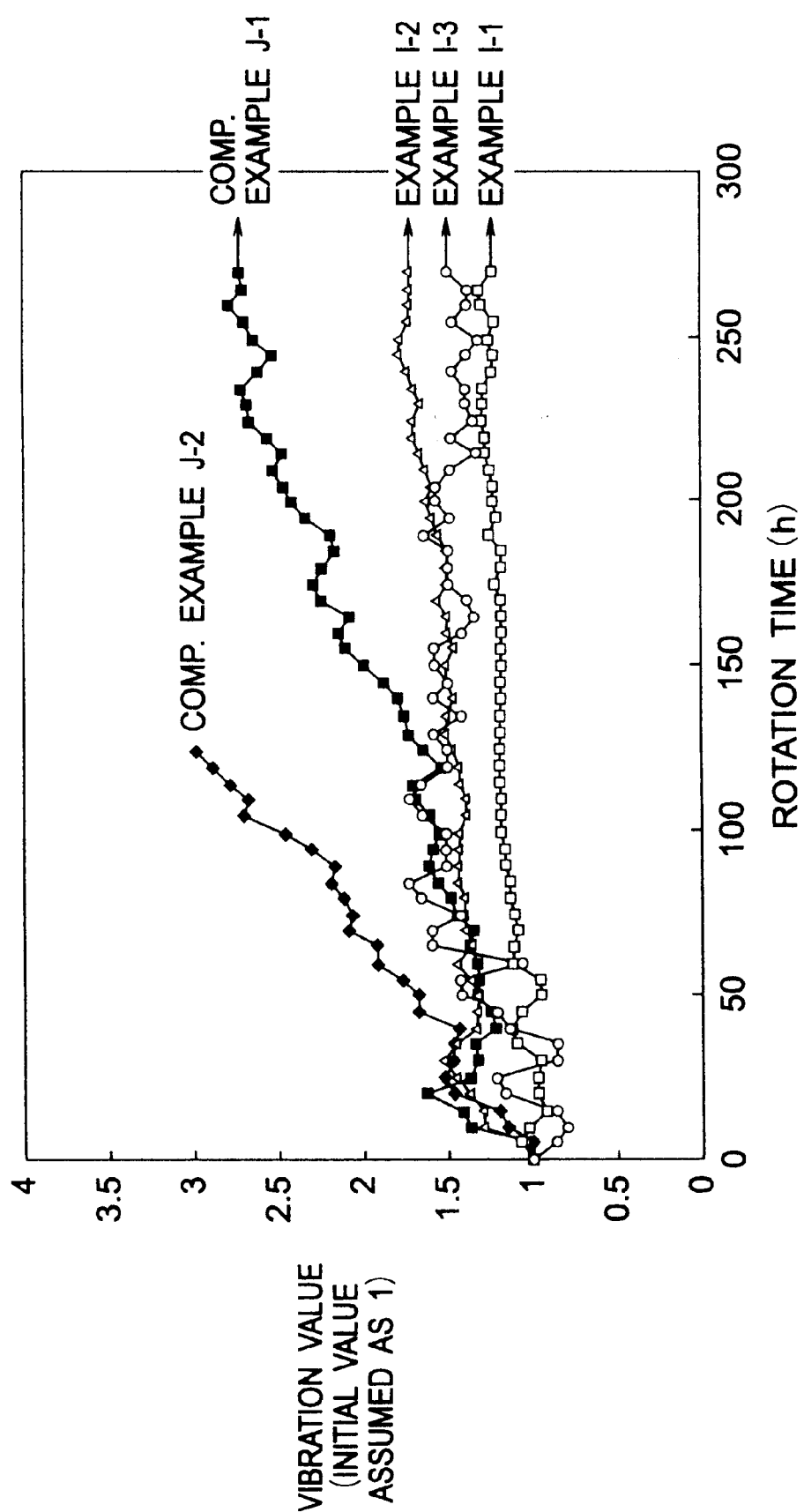
FIG. 21 is a graph showing the result of a test (rotation time) in Example 4.

The results are shown in FIG. 21. Comparative Example J-2 using a spacer comprising a sintered graphite body of low compression strength reached the standard value for the vibration value in about 150 hours and was stopped by vibrations. Upon observation after the test, two out of four spacers at the inside were cracked. Other spacers were also abraded violently (minute destruction). Comparative Example J-2 using a spacer comprising a sintered graphite body reinforced with fibers was rotated till the instance of termination but the spacers were abraded violently and vibrations increased remarkably.

On the contrary, any of Examples I-1 to I-3 showed stable rotational state. Most stable torque was shown in Example I-1 of using iron alloy+molybdenum disulfide as the spacer.

Although not shown in the examples, evaluation was made in the same manner for a case using a spacer made of a self lubricating sintered composite material comprising 55% of the lubricant ingredient that comprises molybdenum disulfide and tungsten disulfide as the main ingredient and the balance of the Fe series alloy (compression strength: 120–130 MPa), which showed satisfactory lubricating characteristics like that in Example I-1.

EXAMPLE 5.

A rotational test at a relatively high surface pressure and low speed was conducted while assuming a case, for example, of axle support for a kiln car and transportation roll support in a transportation system in a high temperature furnace, for which the solid lubricating rolling bearing of the present invention is actually used.

As the test bearings, those of bearing number 6206 each incorporated with the solid lubricating spacers having a size shown in the table of FIG. 22 were used as in Example 4, and a test was conducted under the same test conditions as described above at a test load of 980N (maximum surface pressure 2.0 GPa), at a number of rotation of 50 rpm and at an atmospheric temperature of 300° C. The values three times the stationary vibration value and the stationary torque value in Example G-1 tested at first were defined as standard values and the test was completed at the instance the vibration value or the torque value of the test bearing exceeded the standard value. Further, for the those not exceeding the standard value even after 300 hours, the test was terminated at the instance.

Figure 23:
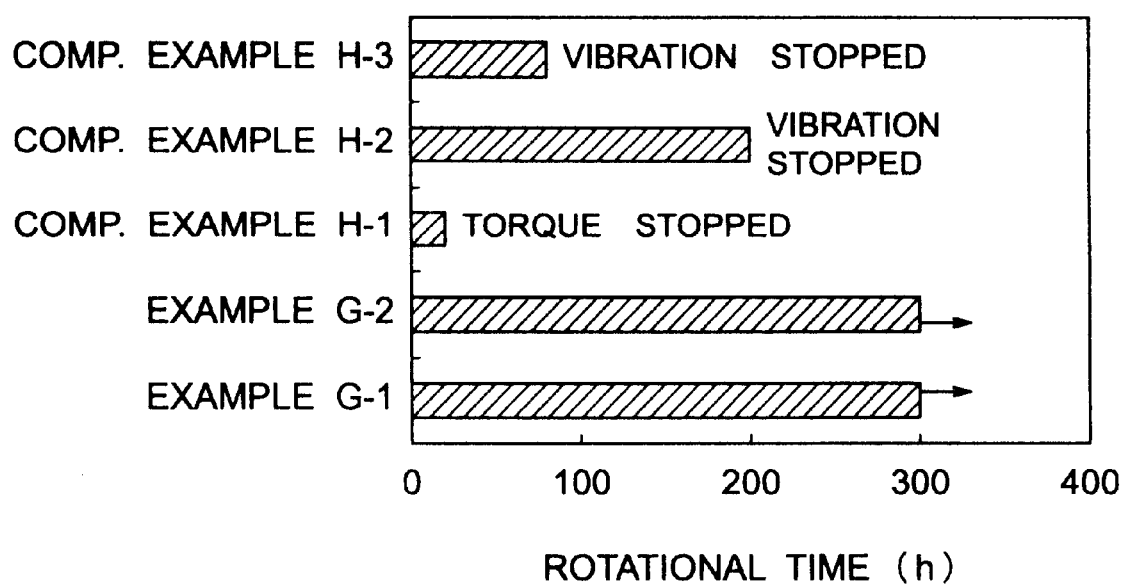
FIG. 23 is a graph showing the result of a test (rotation time) in Example 4.

The results are shown in FIG. 23. Examples G-1 and G-2 satisfied the conditions for the designed standards of the present invention, Comparative Example H-1 is a case where the circumferential gap δ (=δ$_1$+δ$_2$) was reduced to 0 and Comparative Example H-2 is a case where δ increased to 20% or higher for the diameter of the rolling element conversely. Comparative Example H-3 is a case where the spacer diameter/rolling element diameter was reduced to 0.5 or less.

Both of Examples G-1 and G-2 rotated stably up to 300 hours.

On the other hand, Comparative Example H-1 with the circumferential clearance being reduced to 0 showed a large rotation torque in the initial stage of rotation and stopped by torque limit at about 15 hours. Abrasion considered to be caused by contact with the rolling element was observed and it was found that the cage and the rolling element interfered to each other in the inside of the pocket. On the contrary, Comparative Example H-2 with δ being 1 mm or more showed a larger initial vibration value compared with others and showed a tendency that the vibration value always increased during rotation. The vibration value exceeded the standard value in about 200 hours and rotation was stopped by vibrations. Also in Comparative Example H-3, the vibration value was increased violently from the initial stage of rotation, the working life was reached in about 1000 hours and localized abrasion was observed to the spacer at the inside.

Figure 24:
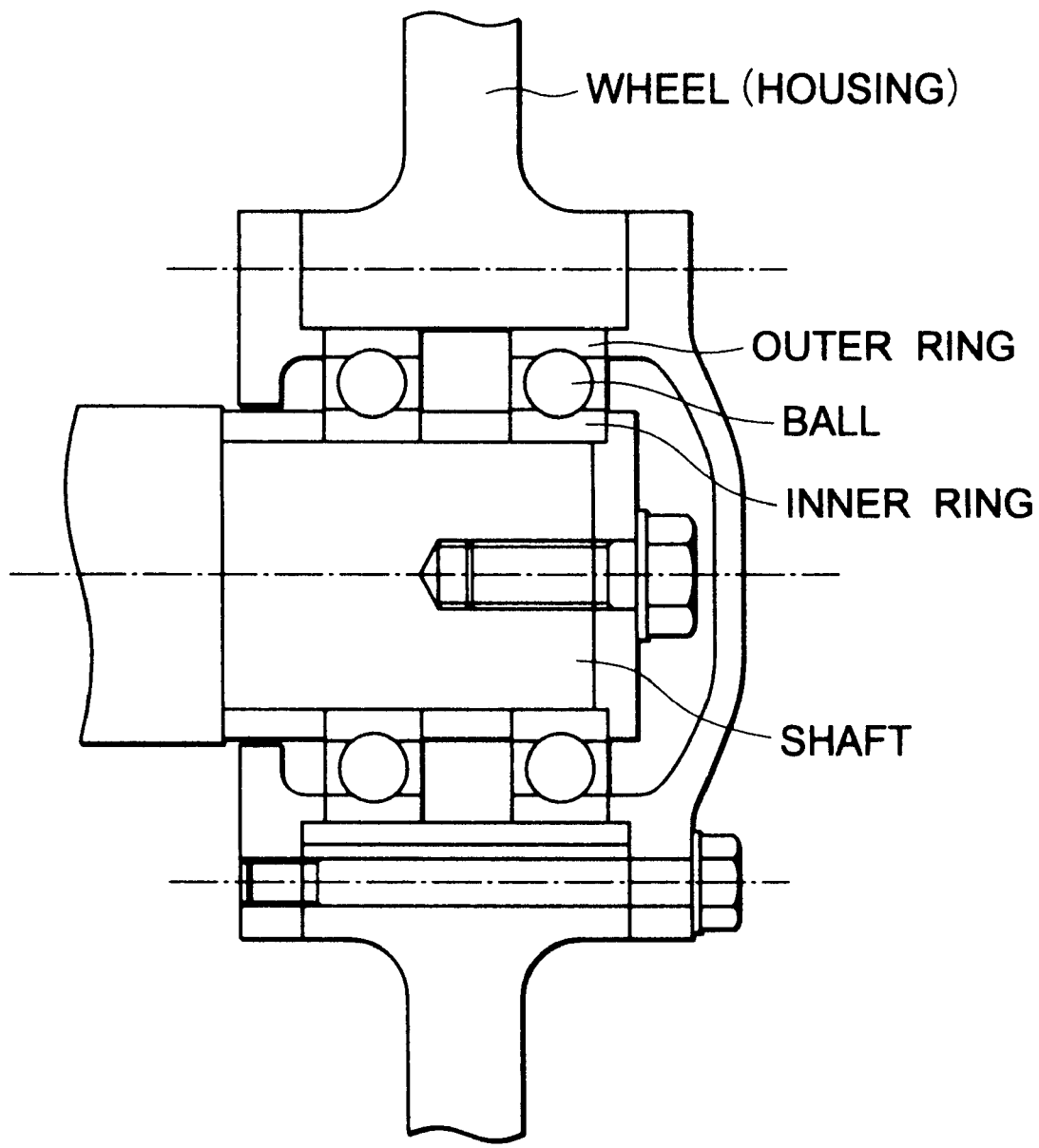
FIG. 24 is a view showing the structure of a bearing for an axle support portion in an actual Kiln car.
Figure 25:
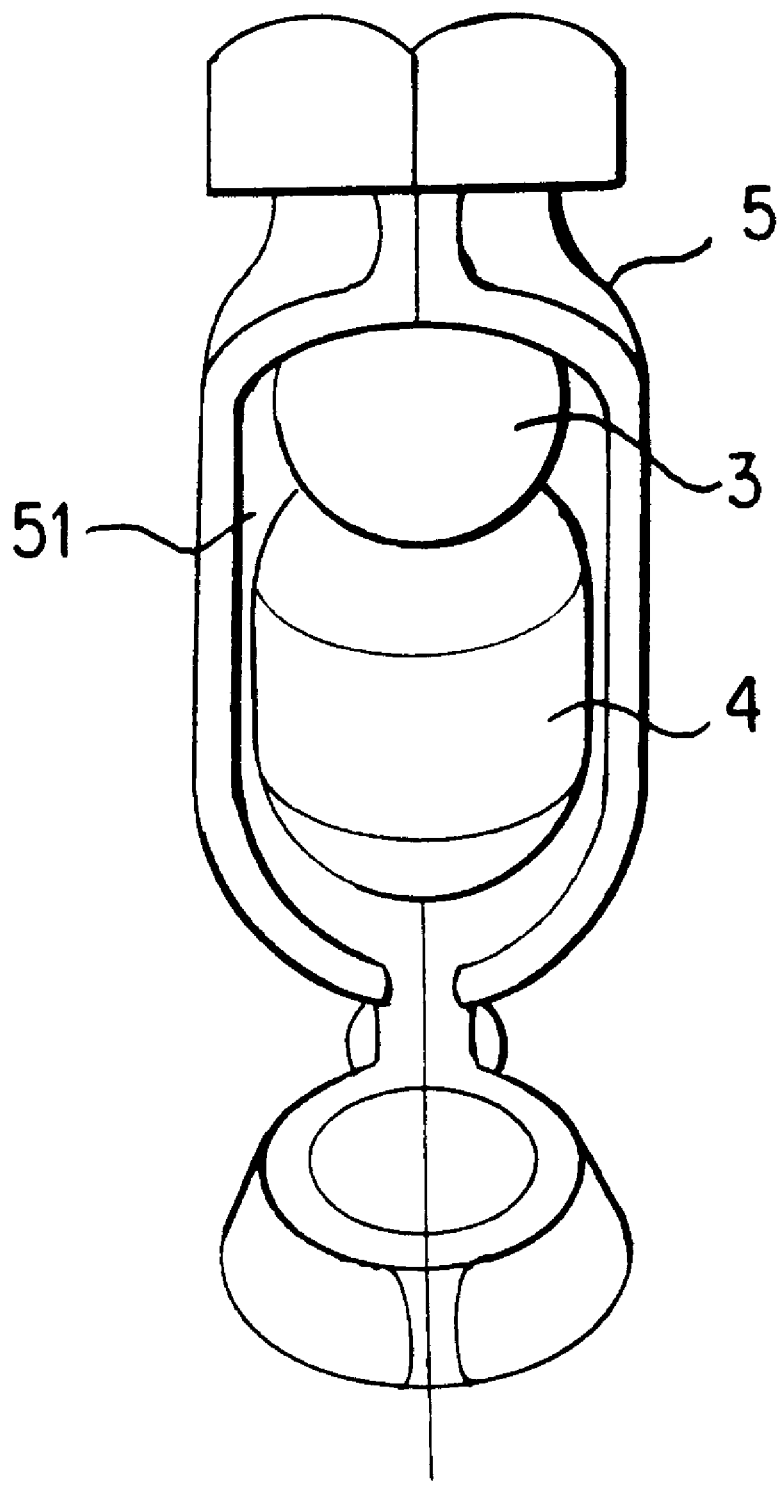
FIG. 25 is an enlarged fragmentary view for a cage with one spacer and one rolling element.

FIG. 24 shows a bearing structure for an axle support portion in an actual kiln car. It has a structure of supporting one wheel on two bearings. The bearing dimension was 6213 (outer diameter: 120 mm, inner diameter: 65 mm, width: 23 mm), which can satisfy all the design specifications of the present invention, in which a self lubricating sintered composite material, comprising 55% of the lubricant ingredient mainly comprising molybdenum disulfide and tungsten disulfide as the main ingredient and the balance of an Fe series alloy as the lubricant was used. The working conditions for the actual car were at a load of 500 kgf, a number of rotation of 0.044 rpm and an atmospheric temperature of 300° C. The bearings used for the test were operated with no maintenance for eight months relative to the usual maintenance period of three month.

INDUSTRIAL APPLICABILITY

As has been described above, since the solid lubricating rolling bearing according to the present invention has a cage for accommodating at least one spacer made of a material containing a solid lubricant and one rolling element, it can provide an advantageous effect capable of appropriately keeping a clearance between each of the spacers and the rolling elements and, as a result, causing no vibrations, capable of preventing dropping of spacers during rotation, and reducing the impact in the circumferential direction caused to the spacer during rotation to suppress the injury of the spacers.

Particularly, since the solid lubricating rolling bearing defined in claim 2 can reduce the number of spacers to one-half of the rolling elements in a cage for accommodating two rolling elements that put a spacer therebetween as a unit, the cost can be reduced and the impact in the circumferential direction caused to the spacer during rotation of the bearing can be moderated compared with the existent bearing comprising rolling elements and spacers combined each by an identical number, to suppress the injury to the spacer.

Further, in the solid lubricating rolling bearing of the present invention, since the size for the circumferential clearance of the pocket of the cage is defined within a range from 0.01 mm to 20% for the diameter of the rolling element (claim 3), vibrations in the bearing torque and the cage can be suppressed more effectively.

Further, in the solid lubricating rolling bearing of the present invention as defined in claim 4, since the diameter of the spacer is made from 0.50 to 0.95 times the diameter of the rolling element, the rotational torque can be suppressed to prevent localized abrasion and the vibrations can be maintained at a low level.

Further, in the solid lubricating rolling bearing of the present invention as defined in claim 5, since the radius of curvature for the contact surface of the pocket of the cage with the rolling element is defined as from 1.01 to 1.10 times the radius of the rolling element, the clearance between the cage and the rolling element can be maintained properly, which is extremely advantageous for the prevention of vibrations of the cage.

In the solid lubricating rolling bearing of the present invention as defined in claim 6, since the material for the spacer comprises a self lubricating sintered composite material obtained by using one of molybdenum disulfide, tungsten disulfide or boron nitride, or molybdenum disulfide and tungsten disulfide as the main ingredient of the lubricant and sintering the lubricant ingredient together with a metal selected from Fe, Cu, Ni, W, Sn and Cr or an oxide, nitride or boride thereof, excess generation of abraded dusts or cracking of the spacer can be prevented. Particularly, a self lubricating sintered composite material comprising 80% or less of a lubricant ingredient that comprises molybdenum disulfide and tungsten disulfide as the main ingredient and the balance of Fe alloy has a higher strength compared with those comprising graphite as the main ingredient, shows an appropriate abrasion amount and can be used both in atmospheric air and in vacuum, so that it is suitable to the bearing of the present invention. Further, when the bearing of the present invention is used at a temperature of 350° C. or higher, a self lubricating sintered composite material in which a lubricant comprising boron nitride as the main ingredient and an Ni alloy are composited is more suitable as the spacer material.

The solid lubricating rolling bearing according to the present invention having various characteristics as described above can be utilized particularly suitably to a support bearing for wheels of a kiln car used at a high temperature and at a low speed (claim 7).

What is claimed is:

1. A solid lubricating rolling bearing comprising an inner ring, an outer ring, rolling elements, spacers of material containing a solid lubricant, and a cage with pockets, each of said pockets accommodating at least one of said spacers and at least one of the rolling elements which contacts the at least one spacer as a unit, wherein each of the spacers has a cylindrical shape, and the number of the spacers disposed in a circumferential direction is equal to or less than the number of the rolling elements.

2. A solid lubricating rolling bearing as defined in claim 1, wherein said each of the pockets of the cage is adapted to accommodate one of said spacers and two of the rolling elements that contact the one spacer therebetween as a unit.

3. A solid lubricating rolling bearing as defined in claim 1 or 2, wherein the circumferential clearance of said each of the pockets of the cage is from 0.01 mm to 20.0% of the diameter of the rolling elements.

4. A solid lubricating rolling bearing as defined in claim 1 or 2, wherein the spacer has a diameter and the diameter of the spacer is from 0.50 to 0.95 times the diameter of the rolling element.

5. A solid lubricating rolling bearing as defined in claim 1 or 2, wherein the pocket of the cage has a contact surface with each of the rolling elements, the contact surface has a radius of curvature, and the radius of curvature is selected as from 1.01 to 1.10 times the radius of the rolling elements.

6. A solid lubricating rolling bearing as defined in claim 1 or 2, wherein the material of the spacers is a self-lubricating sintered composite material comprising a member of the group consisting of molybdenum disulfide, tungsten disulfide, boron nitride, and a combination of molybdenum disulfide and tungsten disulfide as a main ingredient of the lubricant and is obtained by sintering the lubricant main ingredient together with a metal selected from the group consisting of Fe, Cu, Ni, W, Sn, Co and Cr, or an oxide, nitride or boride thereof.

7. In combination, a wheel of a kiln car and a support bearing comprising a solid lubricating rolling bearing as defined in claim 1 or 2.

* * * * *